United States Patent [19]

Young

[11] Patent Number: 4,976,063
[45] Date of Patent: Dec. 11, 1990

[54] LAWN EDGING SYSTEM AND ASSOCIATED EDGING COMPONENTS

[76] Inventor: William J. Young, Rt. 10, Box 230, McMinnville, Tenn. 37110

[21] Appl. No.: 364,208

[22] Filed: Jun. 9, 1989

[51] Int. Cl.$^5$ .................. E01C 11/22; A01G 1/00
[52] U.S. Cl. ................................ 47/33; 52/102
[58] Field of Search .............. 52/102, 287; 47/23, 47/24, 25, 32, 33, 48.5; 404/7, 8

[56] References Cited

U.S. PATENT DOCUMENTS

| | | | |
|---|---|---|---|
| 313,424 | 3/1885 | Hughes | 47/25 |
| 2,235,356 | 3/1941 | Byers | 52/102 |
| 3,491,660 | 1/1970 | Kwasney | 47/33 |
| 3,520,082 | 7/1970 | Smith | 52/102 |
| 3,745,701 | 7/1973 | Marvin | 52/102 |
| 4,031,676 | 6/1977 | Dally | 52/102 |
| 4,074,479 | 2/1978 | Krupka | 47/33 |
| 4,268,992 | 5/1981 | Scharf, Sr. | 47/25 X |
| 4,349,989 | 9/1982 | Snider, Jr. | 47/53 |
| 4,835,921 | 6/1989 | Baggett, Jr. et al. | 52/287 |

Primary Examiner—David A. Scherbel
Assistant Examiner—Michele A. Van Patten
Attorney, Agent, or Firm—Pitts and Brittian

[57] ABSTRACT

A lawn edging system and associated edging components for providing selectively configured landscape borders. The edging system (10) comprises releasably joined edging components (12, 14), each of the components (12, 14) having a body defining first and second end portion (20 and 22) and upper and lower surfaces (36 and 30). The body includes a base portion (16) for supporting the component (12, 14) on a supporting surface and an upright portion (18) extending substantially the length of the component (12, 14). Further, each second end portion (22) of the body defines an indented section (34) provided in the upper surface (36) of the component body for releasably receiving the first end portion (20) of another component (12, 14), whereby the edging components (12, 14) are releasably joined.

4 Claims, 3 Drawing Sheets

LAWN EDGING SYSTEM AND ASSOCIATED EDGING COMPONENTS

DESCRIPTION

1. Technical Field

This invention relates to an improved lawn edging system for providing selectively configured landscape borders. In this particular invention, the edging system includes a plurality or edging components which can be releasably joined to produce various geometric configurations.

2. Background Art

It has long been a common practice to place borders around gardens, flower beds, trees, shrubs and the like, and various edging constructions have been utilized to provide such borders. Such known constructions include lengths of board or other material which can be laid on the ground or partially buried in the ground to serve as a landscaping border It has also been known to use partially embedded brick or tile for such landscaping borders. However, these known prior art devices require substantial time for installation and often require continuous maintenance. Various systems have been disclosed in an effort to simplify the construction of landscaping borders, but generally these systems sacrifice aesthetics or durability for simplicity and ease of construction. Certain of these systems are disclosed in U.S. Letters Patent Nos. 2,912,792; 3,087,279; 3,277,606; 3,396,488; 3,515,373; 3,520,082; 3,545,128; 3,806,096; 3,857,747; 4,074,479; 4,197,684; 4,268,992; and 4,349,596.

Therefore, it is an object of the present invention to provide a simple, yet inexpensive, law edging system which can be easily installed and requires little, if any, maintenance.

Another object of the present invention is to provide a lawn edging system which can be selectively constructed to provide landscaping borders of various sizes and configurations.

Yet another object of the present invention is to provide an edging system which serves to contain decorative ground cover material.

DISCLOSURE OF THE INVENTION

Other objects and advantages will be accomplished by the present invention which provides a lawn edging system and associated edging components for providing a selectively configured landscape border. The edging system comprises a plurality of releasably joined edging components, each of the components having a body defining first and second end portions, and upper and lower surfaces. The body also includes a base portion for supporting the component on a supporting surface and an upright portion extending substantially the length of the component. Further, each second end portion of the body defines an indented section provided in the upper surface of the component body for releasably receiving the first end portion of another component, whereby the edging components are releasably joined. Also, in the preferred embodiment, the first end portion of each component body defines a further indented section provided in the lower surface of the body for releasably receiving the second end portion of another component.

BRIEF DESCRIPTION OF THE DRAWINGS

The above-mentioned features of the present invention will become more clearly understood from the following detailed description of the invention read with the drawings in which.

BEST MODE FOR CARRYING OUT THE INVENTION

Figure 1:
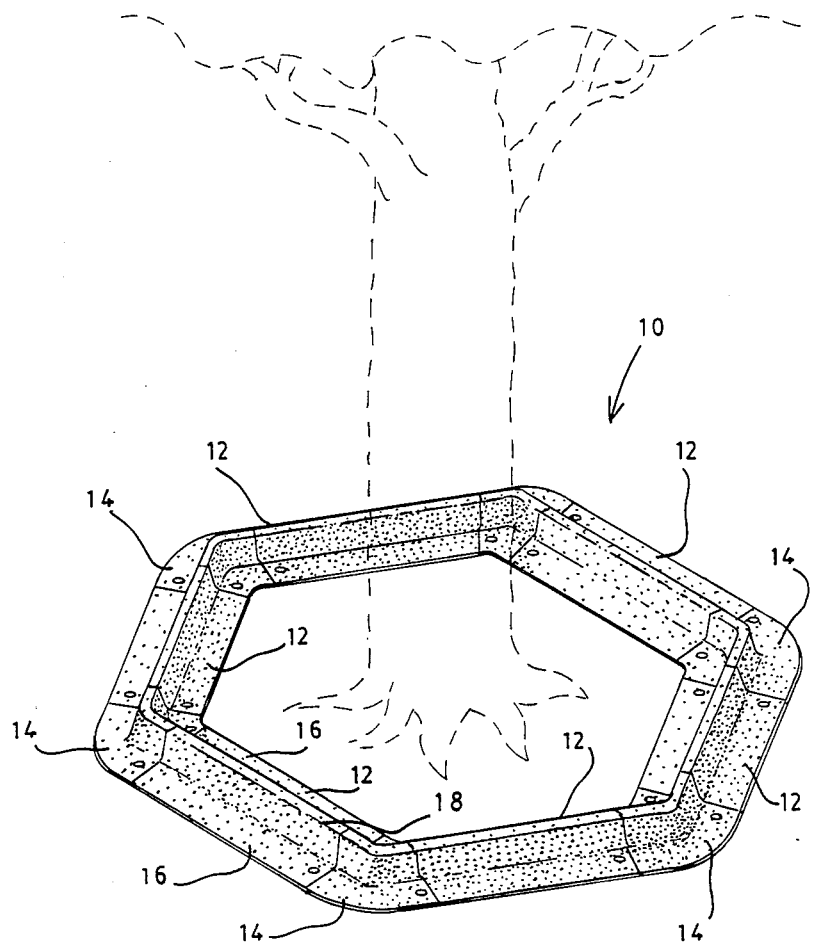
FIG. 1 illustrates a perspective view of a lawn edging system of the present invention.

A lawn edging system incorporating various features of the present invention is illustrated generally at 10 in the figures. As discussed in detail below, the edging system 10 comprises a plurality of releasably interlocking edging components, including the side components 12 and the corner components 14. The edging system 10 can be utilized as a decorative border around gardens, shrubs, or trees, and can be used as a barrier for holding mulch or other decorative ground covers. Moreover, as discussed below, the edging system 10 can be assembled into various geometric configurations depending upon the combinations of components 12 and 14 used.

Referring now to the figures, each of the side and corner components 12 and 14 defines a body having a base portion 16 which engages the lawn or ground and is supported thereon. Further, the body defines an upright portion 18 which extends upwardly from the base portion 16 and spans substantially the length of the component 12, 14 from the first end portion 20 of the component to the second end portion 22 of the component 12, 14. Whereas, the components 12, 14 can be constructed from various fabricating materials, the components 12, 14 are preferably fabricated from a moldable or extrudable plastic, and the base portion 16 and the upright portion 18 are integrally formed. More specifically, the cross-section of the upright portion 18 defines an inverted U-shaped configuration, and the base portion 16 defines oppositely disposed flanges 24 and 26 which extend outwardly on either side of the upright portion 18. It will be recognized by those skilled in the art that this preferred construction can be accomplished through the use of various plastic molding or extrusion processes such that the components 12 and 14 can be inexpensively manufactured.

Figure 2:
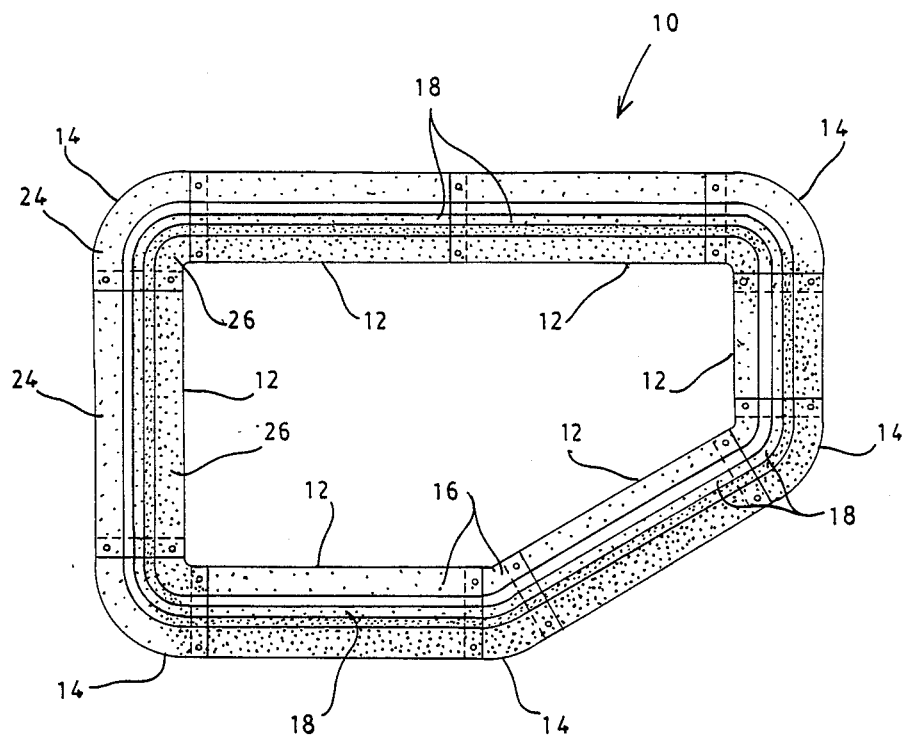
FIG. 2 illustrates a top view of a lawn edging system of the present invention.

As illustrated, the side components 12 define linear sections of the edging system 10 and the corner components 14 comprise arcuate sections of the edging system 10 which can define various angles. Accordingly, the edging 10 is formed by joining preselected component 12 and/or 14, end to end, to produce a selectively configured border. For example, as illustrated in FIG. 1, six (6) corner components 14 and six (6) side components 12 can be combined to produce a hexagonal border around a tree, or, as illustrated in FIG. 2, an irregular configuration can be created through selectively combining corner components 14 and side components 12 to, for example, form a border around irregularly spaced trees or shrubs.

With respect to the releasably joining of the opposite end portions 20 and 22 of the components 12 and 14, it will be noted that in the preferred embodiment the first end portion 20 of each component 12, 14 is provided with an indented section 28 which extends laterally across the lower surface 30 of the component 12, 14 and which defines a downwardly facing engaging surface 32. Further, the second end portion 22 of each component 12, 14 is provided with a further indented section 34 which extends laterally across the upper surface 36 of the component 12, 14 and defines an upwardly facing engaging surface 38 for releasably engaging the surface 32. Thus, when constructing an edging system 10, the first engaging surface 32 of the first end portion 20 of one component 12, 14 engages the further engaging surface 38 of the second end portion 22 of an adjacent component 12, 14 such that such first end portion 20 overlaps the second end portion 22 of the adjacent component. Further, in the preferred embodiment, the combined depths of the indented sections 28 and 34 substantially equals the width of the components 12/14. Resultantly, when the end portions of adjacent components 12 and 14 are joined, the upper surfaces 36 of the components are aligned to produce a less conspicuous joint and the lower surfaces 30 of the components are aligned to more uniformly engage the ground.

Figure 3:
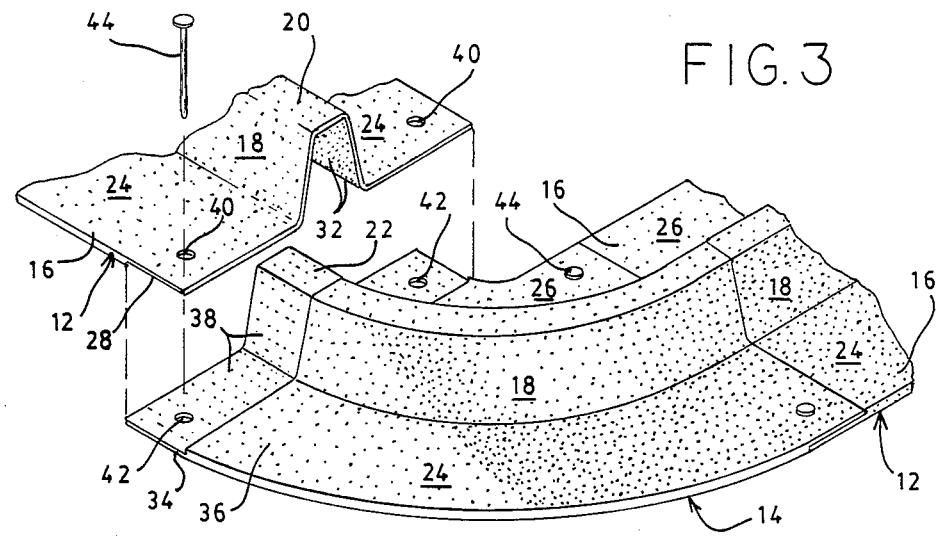
FIG. 3 illustrates a partial perspective view of a lawn edging of the present invention.
Figure 4A:
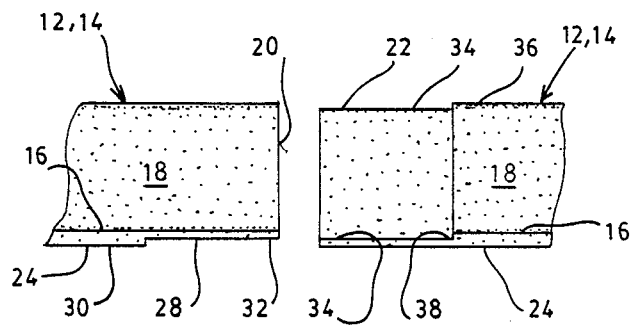
FIG. 4A illustrates a partial side elevation of two edging components of a lawn edging system of the present invention.
Figure 4B:
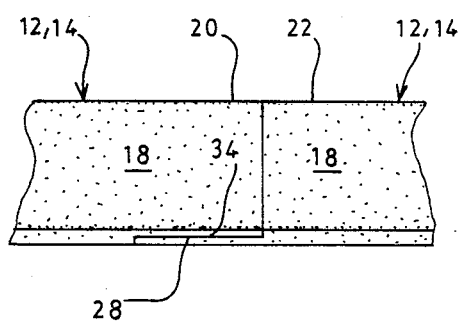
FIG. 4B illustrates a partial side elevation of two edging components of a lawn edging system of the present invention.

In order to secure the end portions of the components 12 and 14 together and to facilitate anchoring the edging system 10 to the ground, the first end portion 20 of each component 12, 14 is provided with one or more holes 40 and the second end portion 22 of each component 12, 14 is provided with one or more further holes 42 which register with the holes 40 of adjacent components when the end portions are joined. As is best illustrated in FIG. 3, the holes 40 and 42 are designed to receive fastening spikes 44 which are received through the holes 40 and 42 of adjacent components and driven into the ground. Of course, because the spikes 44 are received through the components 12, 14 at the point where adjacent components overlap, the spikes 44 serve both as an anchoring means and as a means for securing adjacent components together.

Figure 5:
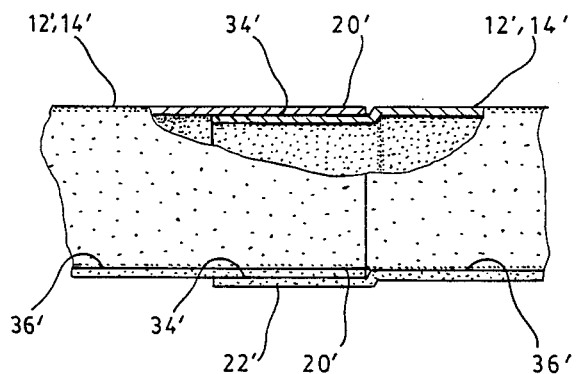
FIG. 5 illustrates a partial side elevation of two edging components of a lawn edging system of the present invention.

In FIG. 5, an alternative embodiment of the edging components of the present invention is embodiment, only the second end portion 22' of referenced at 12', 14'. In this alternative each component is provided with an indented section 34', and the indented section 34' is formed by off-setting the end portion 22'. Accordingly, the indented section 34' receives the end portion 20' of an adjacent component 12', 14'. However, whereas the upper surfaces 36' of the components are aligned, this construction does not result in a smooth, uniform lower surface.

In light of the above, it will be recognized that the edging system 10 and its components 12 and 14 provide a selectively configurable lawn edging that is easily assembled and aesthetically pleasing. In this regard, means by which the components 12 and 14 are joined insures that the joints are inconspicuous while at the same time allow the components to be assembled into various geometric configurations. Moreover, no masonry or carpentry skills are necessary to construct or anchor the edging, and when fabricated from a strong, durable plastic the edging can be inexpensively manufactured and requires little or no maintenance.

While a preferred embodiment has been shown and described, it will be understood that there is no intent to limit the invention to such disclosure, but rather, it is intended to cover all modifications and alternate constructions falling within the spirit and scope of the invention as defined in the appended claims.

I claim:

1. A lawn edging component for being releasably joined with other said edging components to produce a barrier of a sufficient height above a surface of the ground to be suitable for holding within a perimeter formed by said component together with other of said components a quantity of mulching materials, for blocking the lateral growth of adjacent grass, weeds, and such like flora, and for being supported on the surface of the ground, said edging component comprising a body having first and second end portions, said second end portion of said body defining an indented section provided in said upper surface of said body for releasably receiving said first end portion of another said component, whereby said edging component and another said edging component are releasably joined, said body including:

an upright portion having a cross-section substantially defining an inverted U-shaped configuration, said upright portion extending substantially the length of said component, said upright portion defining first and second oppositely disposed sidewalls for forming a barrier to the passage of materials placed thereagainst and the lateral growth of weeds and grass, each said sidewall defining a lower portion;

a first flange carried by and extending outward from said lower portion of said first sidewall of said upright member, and extending substantially the length of said component, said first flange defining a lower planar surface for flush engagement with said ground surface for substantially preventing the lateral growth of grass and weeds; and a second flange carried by and extending outward from said lower portion of said second sidewall of said upright member and extending substantially the length of said component, said second flange defining a lower planar surface for flush engagement with said ground surface for substantially preventing the lateral growth of grass and weeds.

2. The edging component of claim 1 wherein said first flange is provided with at least one first hole disposed proximate said first end portion of said body and said first flange is provided with at least one second hole disposed proximate said second end portion of said body for registering with said first hole of another said component as said indented section of said second end portion receives said first end portion of said other component, and wherein said second flange is provided with at least one third hole disposed proximate said first end portion of said body and said second flange is provided with at least one fourth hole disposed proximate said second end portion of said body for registering with said third hole of another said component as said indented section of said second end portion receives said first end portion of said other component, and wherein said component further comprises a plurality of anchoring spikes for being received through said first, second, third and fourth holes and into ground, whereby said component is secured to another said component and anchored to the ground by inserting one said spike through said first hole of said component, through said second hole of another said component and into the ground, and inserting another said spike through said third hole of said component, through said fourth hole of said other component, and into said ground.

3. The edging component of claim 1 wherein said indented section of said second end portion defines an engaging surface, and wherein said first end portion of said body defines a further indented section provided in said lower surface of said body for receiving said second end portion of another said body, said further indented section defining a further engaging surface for releasably engaging said engaging surface of said indented section of said second end portion of another said edging component.

4. The edging component of claim 3 wherein said first flange is provided with at least one first hole disposed proximate said first end portion of said body and said first flange is provided with at least one second hole disposed proximate said second end portion of said body for registering with said first hole of another said component as said indented section of said second end portion receives said first end portion of said other component, and wherein said second flange is provided with at least one third hole disposed proximate said first end portion of said body and said second flange is provided with at least one fourth hole disposed proximate said second end portion of said body for registering with said third hole of another said component as said indented section of said second end portion receives said first end portion of said other component, and wherein said component further comprises a plurality of anchoring spikes for being received through said first, second third and fourth holes and into ground, whereby said component is secured to another said component and anchored to the ground by inserting one said spike through said first hole of said component, through said second hole of another said component and into the ground, and inserting another said spike through said third hole of said component, through said fourth hole of said other component, and into said ground.

* * * * *